US005721968A

United States Patent [19]

Iwane et al.

[11] Patent Number: 5,721,968

[45] Date of Patent: Feb. 24, 1998

[54] CAMERA HAVING VIBRATION CORRECTION FUNCTION

[75] Inventors: Yukikazu Iwane, Kawasaki; Sueyuki Ohishi, Tokyo; Tatsuo Amanuma, Ageo, all of Japan

[73] Assignee: Nikon Corporation, Tokyo, Japan

[21] Appl. No.: 751,955

[22] Filed: Nov. 19, 1996

Related U.S. Application Data

[63] Continuation of Ser. No. 676,902, Jul. 8, 1995, abandoned, which is a continuation of Ser. No. 375,740, Jan. 20, 1995, abandoned.

[30] Foreign Application Priority Data

Apr. 21, 1994 [JP] Japan .................................... 6-083482

[51] Int. Cl.[6] .................................... G03B 7/26

[52] U.S. Cl. .................................... 396/55; 396/303

[58] Field of Search .................................... 396/301, 303, 396/52, 53, 54, 55; 348/208

[56] References Cited

U.S. PATENT DOCUMENTS 4,965,619 10/1990 Shikaumi et al. .................... 354/70
5,175,580 12/1992 Shiomi .................................... 354/484

*Primary Examiner*—David M. Gray

[57] ABSTRACT

A camera with a vibration correction function prevents a battery from unnecessarily exhausting due to a failure of a vibration corrective lens driving system and provides accurate vibration-resistant control. A vibration corrective lens is subjected either to a centering drive operation to drive an optical axis to a center position of the photographing system or to a resetting drive operation to drive the optical axis to the initial position. When an abnormal drive operation is detected, the centering or resetting operation ceases to supply electric power to the angular velocity detecting circuit, the motor drive circuit, and the lens displacement detecting circuit.

53 Claims, 6 Drawing Sheets

LENS DIS DET CKT (X-AXIS) 18
LENS DIS DET CKT (Y-AXIS) 19
LENS DIS DET CKT (AF) 20
DIST MEAS CKT 2
PHOMET CKT 3
CPU 1
14 15 16 17
MT DR CKT (X-AXIS) 8
MT DR CKT (Y-AXIS) 9
MT DR CKT (AF) 10
M 11 M 12 M 13
EEPROM 4
21 22 23
ANG VELO DET CKT (X-AXIS) 6
ANG VELO DET CKT (Y-AXIS) 7
PW SUP CKT 5

PHOTO PROC
S300
ANG VELO DET CKT PW ON
S301
PHOMET PROC
S302
DIST MEAS PROC
S303
AE CALC
S304
AF CALC
S305
FM CALC
S306
FOC DR
S307
FL-PS SW ON ?
S308
NO
YES
HF-PS SW ON ?
S309
YES
NO
ANG VELO DET CKT PW OFF
S310
RETURN
S311
SELF-MODE ?
S312
YES
NO
10 SEC DELAY
S313
RED-EYE MODE ?
S314
YES
NO
1 SEC PRE-EMIT
S315
1

VIB COR LENS CENT
S500
ST TIMER 1
S501
ST CENT
S502
WAIT A TIME
S503
TIMER 1 UP ?
YES
S504
NO
VR≦PREDET SP ?
YES
S505
NO
VRmax≦PREDET SP ?
YES
S506
NO
VRmin≦PREDET SP ?
YES
S507
NO
VIB COR LENS PREDET POS ?
NO
S508
CENT ABNORMAL
S509
YES
COMPL CENT
S510
RETURN
S511

CAMERA HAVING VIBRATION CORRECTION FUNCTION

This application is a continuation of application Ser. No. 08/676,902, filed Jul. 8, 1996, now abandoned which a continuation of application Ser. No. 08/375,740 filed Jan. 20, 1995, abandoned.

BACKGROUND OF THE INVENTION

1. Field of the Invention

The present invention relates to a camera having a vibration correction function.

2. Related Background Art

Conventionally, cameras with vibration correction functions have vibration correction configuration including a vibration detecting unit, using an angular velocity sensor which detects vibration of a camera, and an optical axis varying unit which varies the optical axis of the photographing optical system.

The optical axis varying unit varies the optical axis by driving, for example, the vibration correction lens, or a part of the photographing optical system, substantially perpendicular to the optical axis, using a motor. In the optical axis varying unit with a motor, gears reduce the rotation of the motor, and convert the rotational movement into a straight motion to move the vibration correction lens.

In such cameras with vibration corrective functions, the vibration correction lens is driven from a predetermined reference position (hereinafter, called an "initial position") so as to set the optical axis thereof to the center position of the photographing optical system while the photo-interrupter is reading the position of the vibration corrective lens. The vibration correction lens is driven, based on the output value from the vibration detecting unit, immediately before the exposure process where a film is exposed through driving a shutter so that an optical axis varying control starts to cancel the vibration of a camera (hereinafter, referred to as "vibration correction control"). After completion of the exposure process, the vibration correction control is completed. Then, the vibration correction lens is driven to the initial position (hereinafter, referred to as "reset-driving") to end a series of steps.

However, according to the prior art, there is a disadvantage in that a failure or degradation due to aging in the vibration correction lens driving system may cause difficulty in driving the vibration correction lens. Moreover, if the photo-interrupter which detects the position of the vibration correction lens malfunctions, the position of the vibration correction lens may be not detected accurately.

In such a case, the vibration control cannot be performed with good accuracy. Moreover, a battery acting as a power source for a camera may be exhausted and disorder may occur in the drive system such as a drive motor and a motor IC.

SUMMARY OF THE INVENTION

In order to overcome the foregoing problems, an object of the present invention is to provide a camera with a vibration preventing function which can prevent a battery from exhausting due to a failure of the vibration corrective lens driving system so that vibration can be accurately prevented.

In order to achieve the objects described above, according to a first approach of the present invention, a camera with a vibration preventing function is characterized by a vibration detecting unit for detecting vibration of the camera; an optical axis varying unit for varying the optical axis of a photographing lens; a drive unit for driving the optical axis varying unit; a displacement detecting unit for detecting the displacement of the optical axis varying unit; a power supply unit for supplying electric energy to the vibration detecting unit; and a control unit for halting a centering drive operation when an abnormal operation is detected during the centering drive operation (by which the optical axis varying unit is driven) to align substantially a corrective optical axis with the photographing optical axis by means of the drive unit, and then for stopping electric power supplied from the power supply unit to the vibration detecting unit.

According to a second approach of the present invention, a camera with a vibration correction function is characterized by a vibration detecting unit for detecting vibration of the camera; an optical axis varying unit for varying the optical axis of a photographing lens; a drive unit for driving the optical axis varying unit; a displacement detecting unit for detecting the displacement of the optical axis varying unit; a power supply unit for supplying electric energy to the vibration detecting unit; and a control unit for halting a centering drive operation when an abnormal operation is detected during the centering drive operation by which the optical axis varying unit is driven to align substantially a corrective optical axis with the photographing optical axis by means of the drive unit, and then for stopping electric power supplied from the power supply unit to the drive unit.

According to a third approach of the present invention, a camera with a vibration correction function is characterized by a vibration detecting unit for detecting vibration of the camera; an optical axis varying unit for varying the optical axis of a photographing lens; a drive unit for driving the optical axis varying unit; a displacement detecting unit for detecting the displacement of the optical axis varying unit; a power supply unit for supplying electric energy to the vibration detecting unit; and a control unit for halting a centering drive operation when an abnormal operation is detected during the centering drive operation by which the optical axis varying unit is driven to align substantially a corrective optical axis with the photographing optical axis by means of the drive unit, and then for stopping electric power supplied from the power supply unit to the displacement detecting unit.

In a camera which has the vibration correction function employing any one of the first to third approaches, a fourth approach is characterized in that the control unit decides that the centering drive operation is abnormal when a predetermined period of time has passed from the start of the centering drive operation.

In a camera which has the vibration correction function employing any one of the first to third approaches, a fifth approach is characterized by further including a displacement velocity calculating unit for calculating a displacement velocity, based on the output from the displacement detecting unit; and in that the control unit decides that the centering drive operation is abnormal when the displacement velocity is smaller than a predetermined value during the centering drive operation.

In a camera which has the vibration correction function employing any one of the first to third approaches, a sixth approach is characterized by further including a displacement velocity calculating unit for calculating a displacement velocity, based on the output from the displacement detecting unit; and in that the control unit decides that the centering drive operation is abnormal when the displacement velocity is smaller than a predetermined value after a predetermined period of time has passed from the start of the centering drive operation.

In a camera which has the vibration correction function employing any one of the first to third approaches, a seventh approach is characterized by further including a displacement velocity calculating unit for calculating a displacement velocity, based on the output from the displacement detecting unit, and a maximum displacement velocity detecting unit for detecting the maximum value of the displacement velocity during the centering drive operation; and in that the control unit decides that the centering drive operation is abnormal when the maximum displacement velocity detecting unit produces an output value smaller than a predetermined value during the centering drive operation.

In a camera which has the vibration correction function employing any one of the first to third approaches, an eighth approach is characterized by further including a displacement velocity calculating unit for calculating a displacement velocity, based on the output from the displacement detecting unit, and a maximum displacement velocity detecting unit for detecting the maximum value of the displacement velocity after a predetermined period of time has passed from the start of the centering drive operation; and in that the control unit decides that the centering drive operation is abnormal when the maximum displacement velocity detecting unit produces an output value smaller than a predetermined value during the centering drive operation.

In a camera which has the vibration correction function employing any one of the first to third approaches, a ninth approach is characterized by further including a displacement velocity calculating unit for calculating a displacement velocity, based on the output from the displacement detecting unit, and a minimum displacement velocity detecting unit for detecting the minimum value of the displacement velocity during the centering drive operation; and in that the control unit decides that the centering drive operation is abnormal when the minimum displacement velocity detecting unit produces an output value smaller than a predetermined value during the centering drive operation.

In a camera which has the vibration correction function employing any one of the first to third approaches, a tenth approach is characterized by further including a displacement velocity calculating unit for calculating a displacement velocity, based on the output from the displacement detecting unit, and a minimum displacement velocity detecting unit for detecting the minimum value of the displacement velocity after a predetermined period of time has passed from the start of the centering drive operation; and in that the control unit decides that the centering drive operation is abnormal when the minimum displacement velocity detecting unit produces an output value smaller than a predetermined value during the centering drive operation.

In a camera which has the vibration correction function employing any one of the first to third approaches, a eleventh approach is characterized in that the control unit produces a predetermined negative value which is compared with the output value from the minimum displacement velocity detecting unit during the centering drive operation.

In a camera which has the vibration correction function employing any one of the first to third approaches, a twelfth approach is characterized in that the control unit performs a vibration corrective control under which said drive unit is driven to correct vibration of the camera, based on an output from the vibration detecting unit, and halts the vibration corrective operation when it is detected that the centering drive operation is abnormal.

According to a thirteenth approach, a camera with a vibration correction function is characterized by an optical axis varying unit for varying the optical axis of a photographing lens; a drive unit for driving the optical axis varying unit; a displacement detecting unit for detecting the displacement of the optical axis varying unit; a power supply unit for supplying electric energy to the vibration detecting unit; and a control unit for halting a reset and drive operation when an abnormal reset and drive operation is detected when the drive unit resets and drives the optical axis varying unit to an initial position, and for stopping electric power supplied from the power supply unit to the drive unit.

According to a fourteenth approach, a camera with a vibration correction function is characterized by an optical axis varying unit for varying the optical axis of a photographing lens; a drive unit for driving the optical axis varying unit; a displacement detecting unit for detecting the displacement of the optical axis varying unit; a power supply unit for supplying electric energy to the vibration detecting unit; and a control unit for halting a reset and drive operation when an abnormal reset and drive operation is detected during the reset and drive operation in which the drive unit drives the optical axis varying unit to an initial position, and then for stopping electric power supplied from the power supply unit to the displacement detecting unit.

In a camera which has the vibration correction function employing any one of the thirteenth to fourteenth approaches, a fifteenth approach is characterized in that the control unit decides that the reset and drive operation is abnormal when a predetermined period of time has passed from the start of the reset and drive operation.

In a camera which has the vibration correction function employing any one of the thirteenth to fourteenth approaches, a sixteenth approach is characterized by further including a displacement velocity calculating unit for calculating a displacement velocity, based on the output from the displacement detecting unit; and in that the control unit decides that the reset and drive operation is abnormal when the displacement velocity is smaller than a predetermined value during the reset and drive operation.

In a camera which has the vibration correction function employing any one of the thirteenth to fourteenth approaches, a seventeenth approach is characterized by further including a displacement velocity calculating unit for calculating a displacement velocity, based on the output from said displacement detecting unit, and a maximum displacement velocity detecting unit for detecting the maximum value of the displacement velocity during the centering drive operation; and in that the control unit decides that the centering drive operation is abnormal when the maximum displacement velocity detecting unit produces an output Value smaller than a predetermined value during the centering drive operation.

In a camera which has the vibration correction function employing any one of an thirteenth to fourteenth approaches, the eighteenth approach is characterized by further including a displacement velocity calculating unit for calculating a displacement velocity, based on the output from the displacement detecting unit, and a maximum displacement velocity detecting unit for detecting the maximum value of the displacement velocity during the reset and drive operation; and in that the control unit decides that the reset-drive operation is abnormal when the maximum displacement velocity detecting unit produces an output value smaller than a predetermined value during the reset and drive operation.

In a camera which has the vibration correction function employing any one of the thirteenth to fourteenth approaches, a nineteenth approach is characterized by further including a displacement velocity calculating unit for calculating a displacement velocity, based on the output from the displacement detecting unit, and a maximum displacement velocity detecting unit for detecting the maximum value of the displacement velocity after a predetermined period of time has passed from the start of the reset and drive operation; and in that the control unit decides that the reset and drive operation is abnormal when the maximum displacement velocity detecting unit produces an output value smaller than a predetermined value during the reset and drive operation.

In a camera which has the vibration correction function employing any one of the thirteenth to fourteenth approaches, a twentieth approach is characterized by further including a displacement velocity calculating unit for calculating a displacement velocity, based on the output from the displacement detecting unit, and a minimum displacement velocity detecting unit for detecting the minimum value of the displacement velocity during the reset and drive operation; and in that the control unit decides that the reset and drive operation is abnormal when the minimum displacement velocity detecting unit produces an output value smaller than a predetermined value during the reset and drive operation.

In a camera which has the vibration correction function employing any one of the thirteenth to fourteenth approaches, a twenty-first approach is characterized by further including a displacement velocity calculating unit for calculating a displacement velocity, based on the output from the displacement detecting unit, and a minimum displacement velocity detecting unit for detecting the minimum value of the displacement velocity after a predetermined period of time has passed from the start of the reset and drive operation; and in that the control unit decides that the reset and drive operation is abnormal when the minimum displacement velocity detecting unit produces an output value smaller than a predetermined value during the reset and drive operation.

In a camera which has the vibration correction function employing any one of the twentieth to twenty-first approaches, a twenty-second approach is characterized in that the control unit produces a predetermined negative value which is compared with the output value from the minimum displacement velocity detecting unit during the reset and drive operation.

According to the present invention, when an abnormal operation is detected during a vibration correction lens driving operation prior to an exposure process, the centering drive operation is ceased. Thereafter, in the first solving means, a power supply is cut off to the vibration detecting unit such as an angular velocity sensor. In the second solving means, a power supply is cut off to the drive unit such as a motor drive circuit which drives the vibration correction lens. In the third solving means, a power supply is cut off to the displacement detecting unit such as a lens displacement detecting circuit. Thus, the vibration correction control is stopped in the following steps.

According to the present invention, it is decided that the centering drive operation is abnormal in the following cases. For example, in the fourth solving means, when the centering operation has not been completed after a lapse of a predetermined period from the start of the centering drive operation, it is decided that the centering drive operation is abnormal. In the fifth solving means, when the displacement velocity during the centering drive operation is smaller than a predetermined value, it is decided that the centering drive operation is abnormal. In the sixth solving means, the displacement velocity after a lapse of a predetermined period from the start of the centering drive operation, it is decided that the centering drive operation is abnormal. In the seventh solving means, when the maximum displacement velocity is detected during the centering drive operation and is smaller than a predetermined value, it is decided the centering drive operation is abnormal. In the eighth solving means, when the maximum displacement velocity after a lapse of a predetermined period from the start of a centering drive operation is detected during the centering drive operation and is smaller than a predetermined value, it is decided that the centering drive operation is abnormal. In the ninth solving means, when the minimum displacement velocity is detected during the centering drive operation and is smaller than a predetermined value, it is decided that the centering drive operation is abnormal. In the tenth solving means, when the minimum displacement velocity after a lapse of a predetermined period from the start of the centering drive operation is detected and is smaller than a predetermined value, it is decided that the centering drive operation is abnormal.

According to the present invention, when an abnormal reset and drive operation is detected in the vibration correction lens resetting operation after the exposure process and the vibration correction control have been completed, the reset drive operation is stopped. As a result, in the thirteenth solving means, a power supply to a drive unit such as a vibration correction lens driving motor is cut off. In the fourteenth solving means, a power supply to the lens displacement unit such as a lens displacement detecting circuit is cut off.

According to the present invention, it is decided that the reset and drive operation is abnormal in the following cases. That is, in the fifteenth solving means, when a reset and drive operation has not been completed after a lapse of a predetermined period from the start of the reset and drive operation, it is decided that the reset and drive operation is abnormal. In the sixteenth solving means, when the displacement velocity is smaller than a predetermined value during a reset and drive operation, it is decided that the reset and drive operation is abnormal. In the seventeenth solving means, when the displacement velocity after a lapse of a period from the start of the reset and drive operation is smaller than a predetermined value, it is decided that the reset and drive operation is abnormal. In the eighteenth solving means, when the maximum displacement velocity is detected during the reset and drive operation and is smaller than a predetermined value, it is decided that the reset and drive operation is abnormal. In the nineteenth solving means, when the maximum displacement velocity after a lapse of a predetermined period from the start of the reset and drive operation is detected and is smaller than a predetermined value, it is decided that the reset and drive operation is abnormal. In the twelfth solving means, when the minimum displacement velocity is detected during the reset and drive operation and is smaller than a predetermined value, it is decided that the reset drive operation is abnormal. In the twenty-first solving means, when the minimum displacement velocity after a lapse of a predetermined period from the start of the reset and drive operation is detected and is smaller than a predetermined value, it is decided that the reset and drive operation is abnormal.

As described above, it is possible to prevent a previous malfunction such as breakage of the vibration correction lens drive system and exhaustion of a battery.

DETAILED DESCRIPTION OF THE PREFERRED EMBODIMENTS

An embodiment of the present invention will be described below in more detail with reference to the attached drawings.

Figure 1:
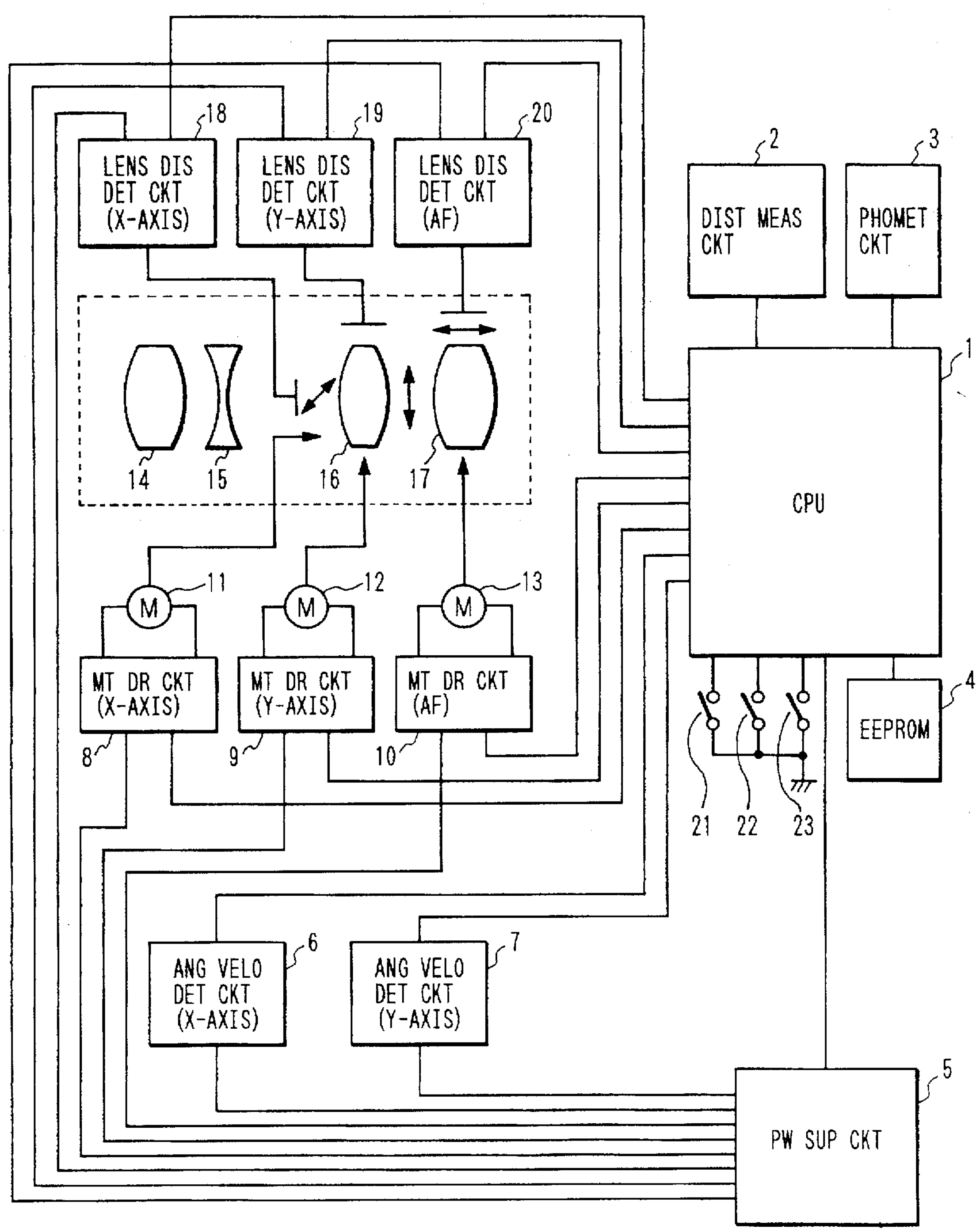
FIG. 1 is a block diagram showing the configuration of an embodiment of a camera with a vibration correction function according to the present invention.

FIG. 1 is a block diagram showing the configuration of a camera with the vibration correction function according to the first embodiment of the present invention.

Photographing lenses 14, 15, 16, and 17 form a four-lens structure. The photographing lens 16, which is subjected to a change in the optical axis by means of an optical axis varying unit, is a lens which can be driven to compensate its vibration in the X-axis (horizontal) direction and the Y-axis (vertical) direction (hereinafter, called "vibration correction lens 16").

To the CPU 1 is connected a distance measuring circuit 2, a photometric circuit 3, an erasable programmable nonvolatile memory (hereinafter, refereed to as "EEPROM 4") 4, a full-pressure switch 23, a power supply circuit 5, a main switch 21, a half-pressure switch 22, a full-pressure switch 23, a power supply circuit 5, angular velocity detecting circuits 6 and 7, motor drive circuits 8, 9, and 10, lens displacement detecting circuits 18, 19, and 20, and other elements.

The main switch 21 is a camera-operation starting switch having an on position and an off position. When a photographer once sets the switch to the on position, the on position is maintained until the switch is reset to the off position. The half-pressure switch 22 is a switch which is turned on by half-depressing the release button. The full-pressure switch 23 is a switch which is turned on by full-depressing the release button.

The power supply circuit 5 is connected to the angular velocity detecting circuits 6 and 7, the motor drive circuits 8, 9, and 10, and the lens displacement detecting circuits 18, 19, and 20. The power supply circuit 5 controls the electric energy supplied to the angular velocity detecting circuits 6 and 7, the motor drive circuits 8, 9, and 10, and the lens displacement detecting circuits 18, 19, and 20, in response to signals from the CPU 1.

The angular velocity detecting circuits 6 and 7 correspond to vibration detecting units. The angular velocity detecting circuit 6 is a circuit which detects the angular velocity in the X-axis direction caused by vibration of a camera. The angular velocity detecting circuit 7 is a circuit which detects the angular velocity in the Y-axis direction caused by vibration of a camera. Each of the angular velocity detecting circuits 6 and 7 varies its output value sent to the CPU 1 in response to the detected angular velocity. The CPU 1 subjects the output to an A/D conversion to detect the angular velocity.

The motor drive circuits 8 and 9 correspond to drive units. The motor drive circuit 8 is a circuit which drives the motor 11 to travel the vibration corrective lens 16 in the X-axis direction. The motor drive circuit 9 is a circuit which drives the motor 12 to travel the vibration corrective lens 16 in the Y-axis direction. The motor drive circuit 8 duty-drives the motor 11 and the motor drive circuit 9 duty-drives the motor 12. Namely, the CPU 1 produces a drive-direction signal for instructing the drive direction and a drive duty signal for instructing the drive velocity, to the motor drive circuits 8 and 9. In response to those signals, the motors 8 and 9 are energized in a predetermined direction and at a predetermined duty to control the vibration corrective lens 16 at a predetermined speed.

A vibration correction lens drive mechanism (not shown) converts the rotation of the motor 11 into a straight movement to drive the vibration correction lens 16 in the X-axis direction. The vibration correction lens drive mechanism (not shown) also converts the rotation of the motor 12 into a straight movement to drive the vibration correction lens 16 in the Y-axis direction.

The lens displacement detecting circuits 18 and 19 correspond to displacement detecting units. The lens displacement detecting circuit 18 is a circuit which reads the position and displacement in the X-axis direction as the vibration corrective lens 16 moves in the X-axis direction. The lens displacement detecting circuit 19 is a circuit which reads the position and displacement in the Y-axis direction as the vibration correction lens 16 moves in the Y-axis direction. The lens displacement detecting circuit 18 calculates the displacement velocity in the X-axis direction and calculates the maximum and minimum displacement velocities in the X-axis direction. The lens displacement detecting circuit 19 calculates the displacement velocity in the Y-axis direction and calculates the maximum and minimum displacement velocities in the Y-axis direction.

The motor drive circuit 10 is a circuit which drives the motor 13 to drive the focusing lens 17 in the optical axis direction. In order to control the focusing lens 17 at a predetermined speed, the motor drive circuit 10 energizes the motor in a predetermined direction according to the result calculated by means of the CPU 1, based on the distance data from the distance measuring circuit 2. A focusing lens drive mechanism (not shown) converts the rotation of the motor 13 into a straight motion to drive the focusing lens 17 in the optical axis direction.

The lens position detecting circuit 20 is a circuit which reads the position and displacement of the optical axis of the focusing lens 17, based on a series of pulses produced as the focusing lens 17 moves in its optical axis direction. The lens position detecting circuit 20 calculates the displacement velocity, based on a displacement for a fixed period of time.

The EEPROM 4 is a non-volatile memory which stores previously predetermined data necessary for a photographing process. When a predetermined sequence wants data, the CPU 1 reads out predetermined data stored in the EEPROM 4.

The CPU 1, which is formed as a one-chip microcomputer, controls the entire sequence for the camera.

The CPU 1 has a timepiece function for measuring internal time, an AE calculation function, an AF calculation function, and an A/D conversion function.

Of programs included in the CPU 1, the flowchart to be described below shows only the correction control process in the X-axis direction vibration related to the present embodiment. In response to the programs included in CPU 1, the CPU 1 functions as a control unit and an abnormal operation unit as illustrated in the following flow charts.

Figure 2:
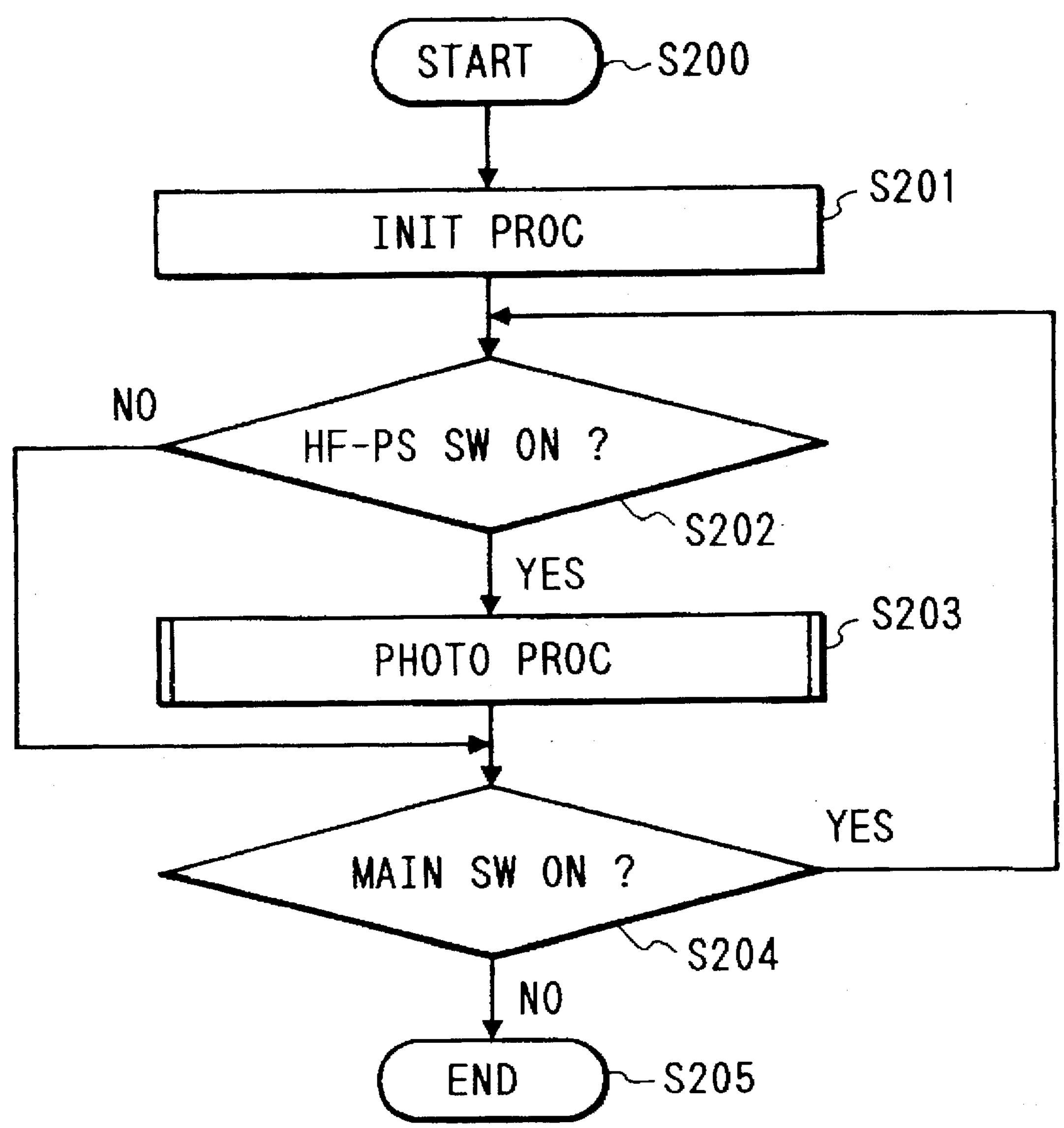
FIG. 2 is a flowchart showing the entire process of a camera with a vibration correction function according to the present embodiment.

FIG. 2 is a flowchart showing the entire process of a camera which has a vibration corrective function according to the present embodiment.

Here, it is assumed that the process starts from the step S200, with the power supply switched on and the main switch 21 switched on.

In the step S201, the CPU 1 initializes internally and then flow goes to the step S202.

In the step S202, it is decided whether the half-pressure switch 2 has been thrown on. If the switch is on, the flow goes to the step S203 to execute a photographing process. Then the flow goes to the step S204. If the switch is off, the flow goes to the step S204.

In the step S204, it is decided whether the main switch 21 has been thrown on. If the switch is on, the flow goes to the step S202 to check again the half-pressure switch 22. If the switch is off, the flow goes to the step S205 and then a series of the steps is terminated.

This means that the status of the main switch 21 and the half-pressure switch 22 are checked. Then if the half-pressure switch 22 is thrown on, with the main switch 21 switched on, the photographing process is performed, but if the main switch is off, the series of steps is terminated.

Figure 3:
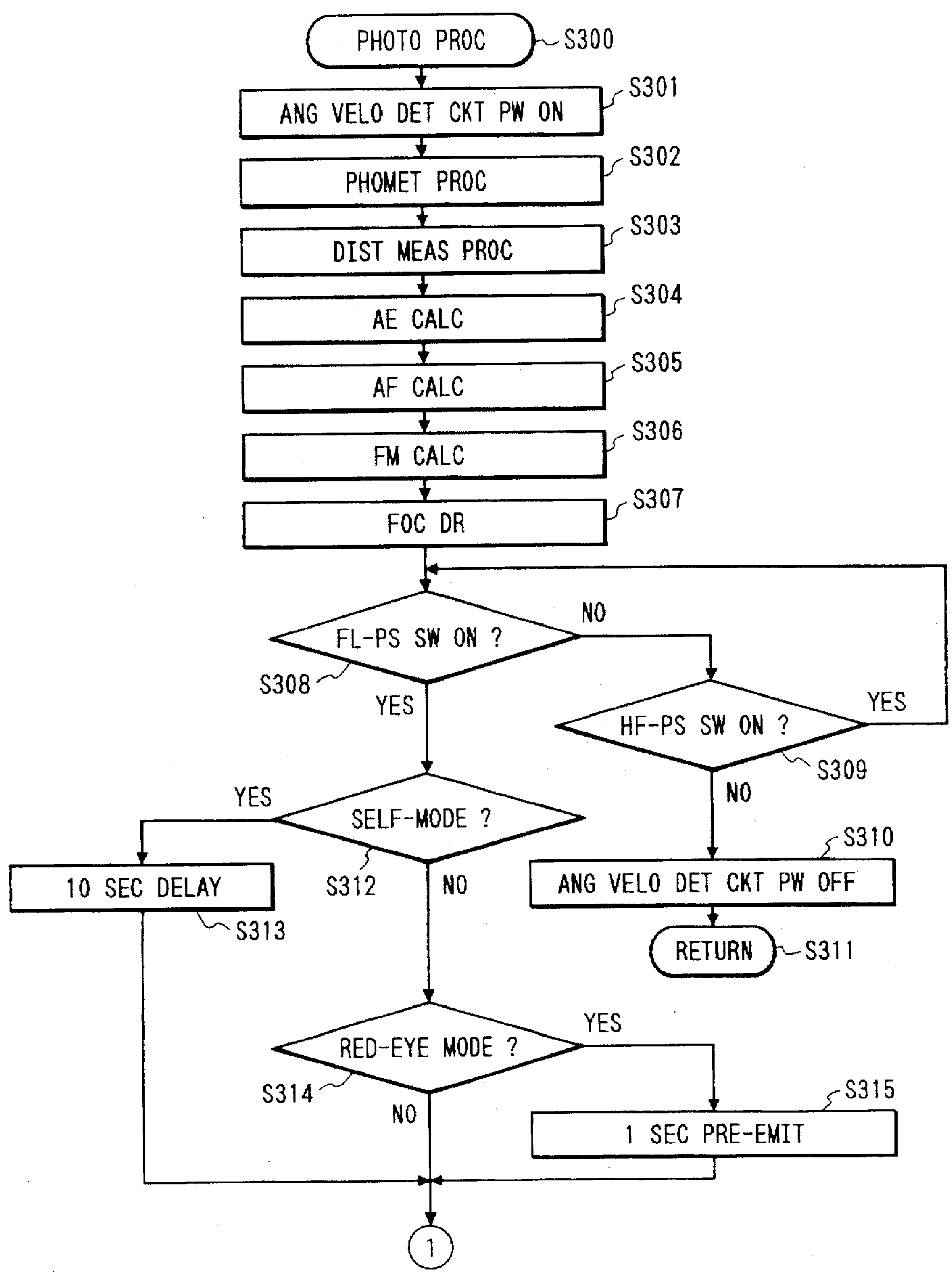
FIG. 3 is a flowchart showing the photographing process of a camera with a vibration correction function according to the present embodiment.
Figure 4:
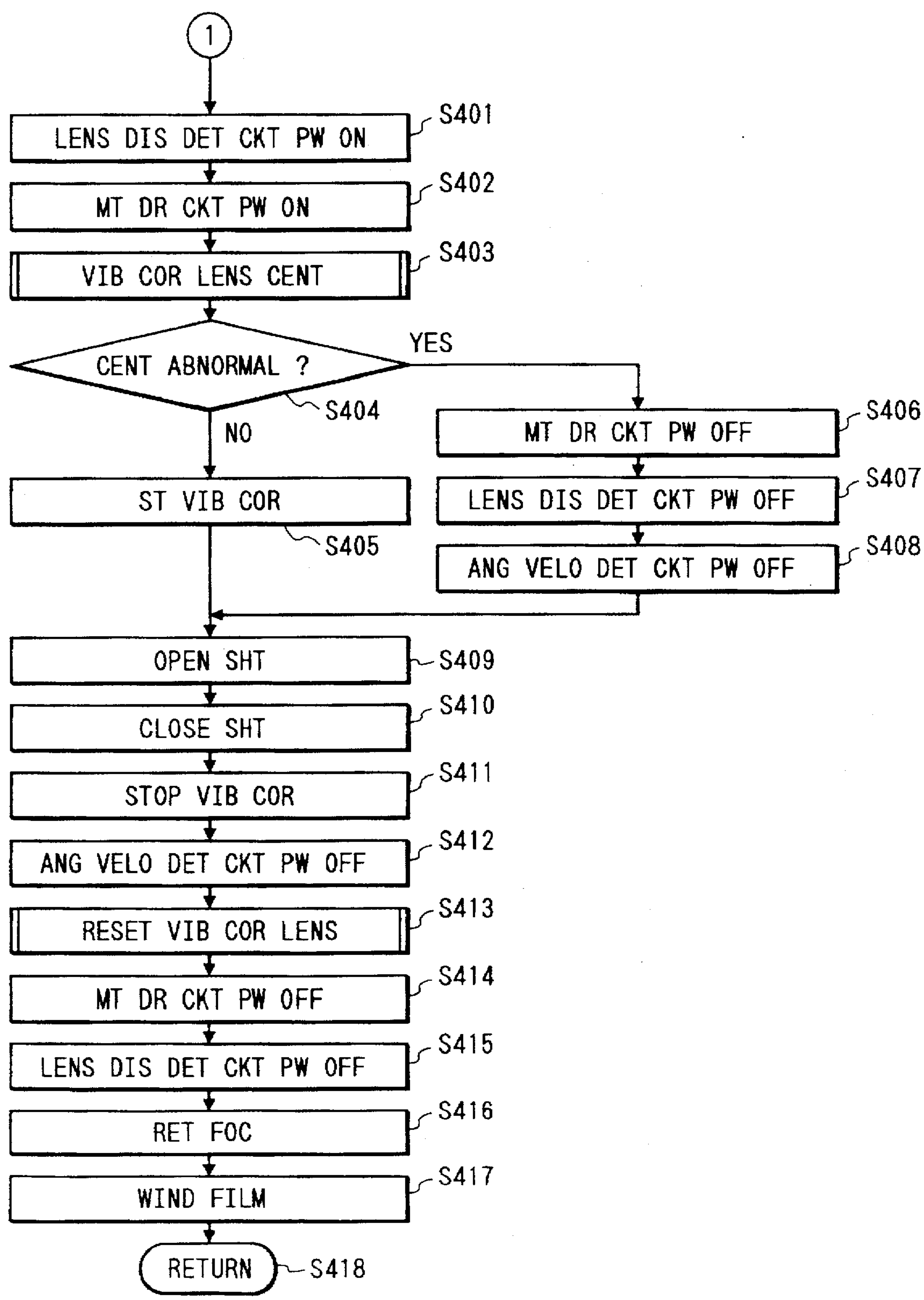
FIG. 4 is a flowchart showing the photographing process of a camera with a vibration correction function according to the present embodiment.

FIGS. 3 and 4 are flowcharts which each show the photographing process of a camera with a vibration correction function according to the present invention.

When the half-pressure switch 22 is thrown on, with the main switch 21 switched on, the photographing process starts from the step S300 shown in FIG. 3.

In the step S301, the power supply circuit 5 is powered on to energize the angular velocity circuits 6 and 7, the vibration angular velocity detecting operation starts. Then the flow goes to the step S302.

In the step S302, the photometric circuit 3 is activated to perform the photometric operation. In the step S303, the distance measuring circuit 2 is activated to perform the distance measuring process. Then the flow goes to the step S304.

In the step S304, an AE calculation is performed based on the photometric result obtained in the step S302. In the step S305, an AF calculation is performed based on the distance measuring result obtained in the step S303. Then the flow goes to the step S307.

In the step S307, the motor drive circuit 10 drives the motor 13 to move the focusing lens 17 from the initial position to the position in the AF step obtained in the step S305. Then the flow goes to the step S308.

In the step S308, it is decided whether the full-pressure switch 23 has been switched on. If the switch is on, the flow goes to the step S312. If the switch is off, the flow goes to the step S309.

In the step S309, it is decided whether the half-pressure half-pressure switch 22 is still in on state. If the switch is on, the flow goes back to the step S308 to check again whether the full-pressure switch is in the on state. If the half-pressure switch 22 is off, the angular velocity detecting circuits 6 and 7 are de-energized by means of the power supply circuit 5 in the step S310. Then the flow goes to the step S202 via the photographing process in the step S311. Then the flow goes to the step S204 in the flowchart shown in FIG. 2.

In other words, with the half-pressure switch 22 thrown on, the angular velocity detecting circuits 6 and 7 detect the angular velocity due to the vibration while they maintain to check the condition of the full-pressure switch 23. Then if the full-pressure switch 23 is switched on, the following steps are executed. If the half-pressure switch 22 is switched off, the photographing process is terminated.

In the steps S312 and 314, it is decided whether a mode switch (not shown) has selected a photographing mode.

In the step S312, it is decided whether the self-timer photographing mode has been selected. If yes, the self-timer measures for 10 seconds in the step S313. Then the flow goes to the step S401.

In the step S314, it is decided whether a red-eye reduction photographing mode has been selected. If yes, illumination is previously done for one second in the step S315. Then the flow goes to the step S401 shown in FIG. 4.

If the self-timer photographing mode as well as the red-eye reduction photographing mode are not selected, the flow goes to the step S401 shown in FIG. 4.

In the step S401, the lens displacement detecting circuits 18 and 19 are energized by means of the power supply circuit 5, then flow goes to the step S403.

In the step S403, a centering drive (S500 in FIG. 5) is performed to set the optical axis of the vibration correction lens 16 from the initial position substantially to a center position of the photographing optical system.

Figure 5:
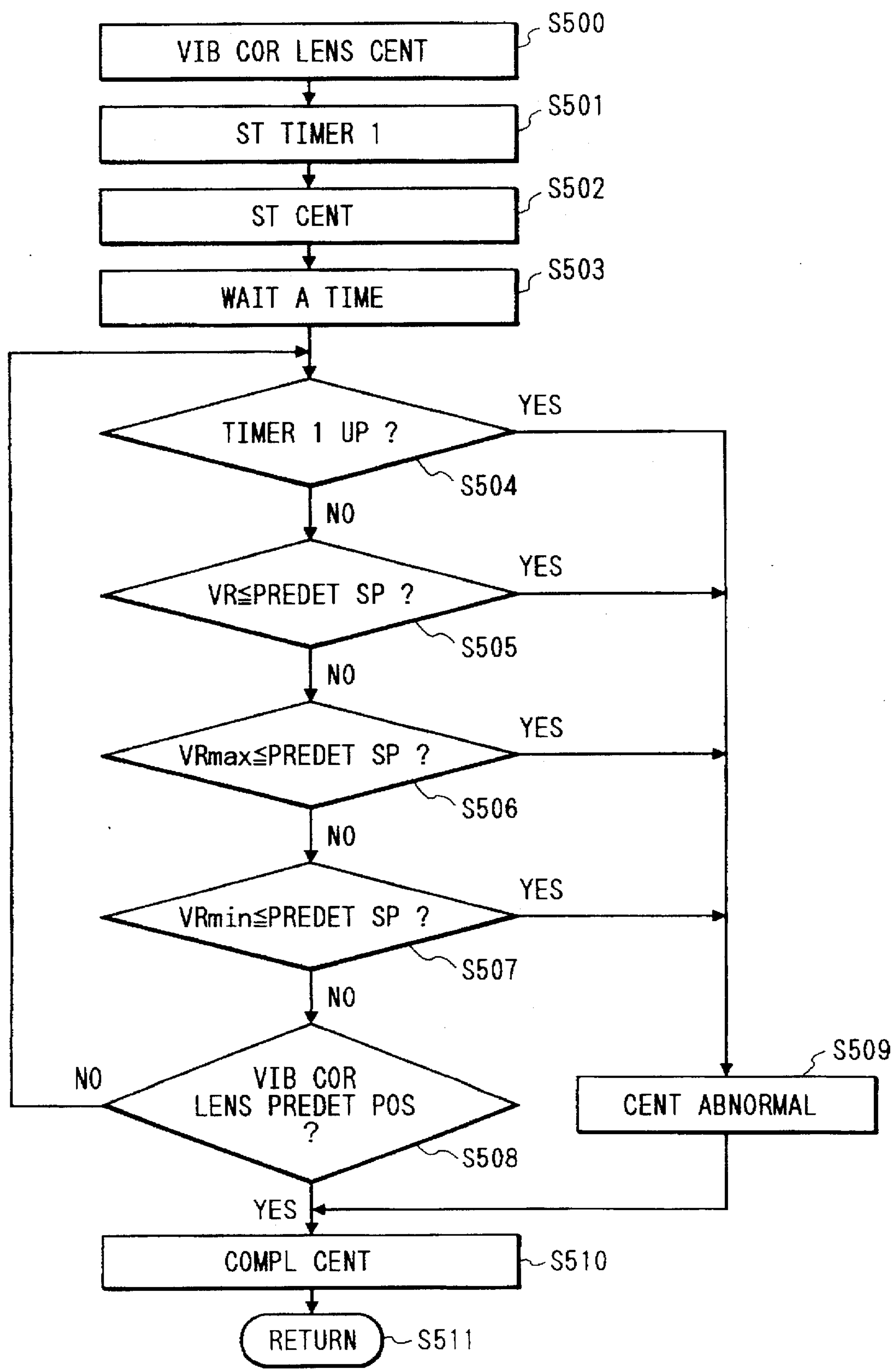
FIG. 5 is a flowchart showing the vibration correction-lens centering drive process in a camera with a vibration correction function according to the present embodiment.

FIG. 5 is a flowchart showing the process of centering the vibration correction lens of a camera with the vibration correction function according to the present invention. The flowchart shows only the X-axis process. Actually, the duplicate drawing and description as to the Y-axis process will be omitted here because the Y-axis process is similar to the X-axis process.

In the step S501, the timer 1 starts to measure the control time taken for the centering drive operation. Then the flow Goes to the step S502.

In the step S502, the motor drive circuit 8 drives the motor 11 to start the centering drive operation of the vibration correction lens 16.

A timer interrupting process is performed from the step S503 to the step S510 at predetermined time intervals. Then the lens displacement detecting circuit 18 calculates the displacement velocity VR, the maximum displacement velocity VRmax, and the minimum displacement velocity VRmin, based on the displacement of the vibration correction lens 16 and the time (not shown). For brief explanation, it is assumed that the centering drive operation is performed in the positive direction of displacement velocity.

In the step S503, the flow stands by for a predetermined period of time. Then the flow Goes to the step S504. The reason why the stand-by operation is made for a predetermined period of time is that deciding that there is an abnormal state in the following steps is avoided because the rise characteristic of the motor 11 causes a small displacement velocity immediately after the centering drive operation. The reason also is that the lens displacement detecting circuit 18, which is formed of, for example, an interrupter, may calculate respectively VR, VRmax, and VRmin as impossible larger or smaller values at the early drive operation, because of its discrete signals.

In the step S504, it is decided whether the timer 1 has completed the time measuring. In the step S505, the displacement velocity VR calculated is compared with the first predetermined velocity. In the step S506, the maximum displacement velocity VRmax calculated is compared with the second predetermined velocity. In the step S507, the minimum displacement velocity VRmin is compared with the third predetermined velocity. In the step S508, it is checked whether the vibration correction lens 16 has reached a predetermined position.

Until the vibration correction lens 16 reaches the predetermined position, the deciding operation is repeated in the steps S504, S505, S506, and S507. When the timer 1 has counted up, the flow Goes to the step S509 at the displacement velocity VR smaller than the first predetermined value, the maximum displacement velocity VRmax smaller than the second predetermined velocity, or the minimum displacement VRmin smaller than the third predetermined value, so that it is regarded that the centering is abnormal. Then the flow Goes to the step S510.

If some trouble disables or completely damages the vibration correction circuit 16, an incomplete centering operation after a predetermined period of time (detected in the step S504), and a difficult movement of the lens (detected in the steps S505 and S506) can be detected.

Here, the third predetermined value is set to a negative value. The reason is that if the centering drive direction is positive, VRmin cannot be usually a negative value. If the third predetermined value is negative, it can be judged that the operation of the lens displacement detecting circuit 18 is abnormal.

In the step S508, when the motor drive circuit 8 stops the driving operation of the motor 11, the flow goes to the step S510.

In the step S510, the motor drive circuit 8 stops the drive operation of the motor 11, thus terminating the centering drive operation of the vibration correction lens 16. Then the flow Goes to the step S404 in FIG. 4.

In the step S404, it is decided whether the centering is abnormal. If the centering is not abnormal, the flow goes to the step S405. Thus, the vibration correction lens 16, which is driven according to the output values from the angular velocity detecting circuits 6 and 7, starts the vibration correction control to vary the optical axis for the vibration cancellation. The flow goes to the step S409.

At an abnormal centering, the power supply circuit 5 cuts off the electric power to the motor drive circuits 8 and 9 in the step S406, the lens displacement detecting circuits 18 and 19 in the step S407, and the angular velocity detecting circuits 6 and 7. Then the flow Goes to the step S409.

In other words, when an abnormal state is detected during the centering drive operation, the power supply used for the motor drive circuits 8 and 9, the lens displacement detecting circuits 18 and 19, and the angular velocity detecting circuits 6 and 7 is cut off so that the vibration correcting control is not executed in the following steps.

In the step S409, a shutter opening process through which the shutter is opened for a predetermined period of time is performed based on the EV value calculated through the AV calculation in the step S304. Then the flow Goes to the step S410. The shutter closing operation is performed in the step S410. Then the flow goes to the step S411.

The vibration correction control is halted in the step S411. The vibration correction control is performed from the step S405 just before the shutter opens, to the step S411 after the shutter has closed. Thereafter, the flow Goes to the step S412.

The angular velocity circuits 6 and 7 stop their operations in the step S412. Then the flow advances to the step S413.

When an abnormal centering is detected, the vibration correction control is not performed, so that it is unnecessary to stop the vibration correction control in the step S411. Since the power supply for the angular velocity circuits 6 and 7 is cut off in the step S408, it is not needed to cut off the same in the step S412.

In the step S413, a reset drive operation (S600 in FIG. 6) is performed to return the vibration correction lens 16 to the initial position. Here, only one-axis process is shown like that in FIG. 5.

Figure 6:
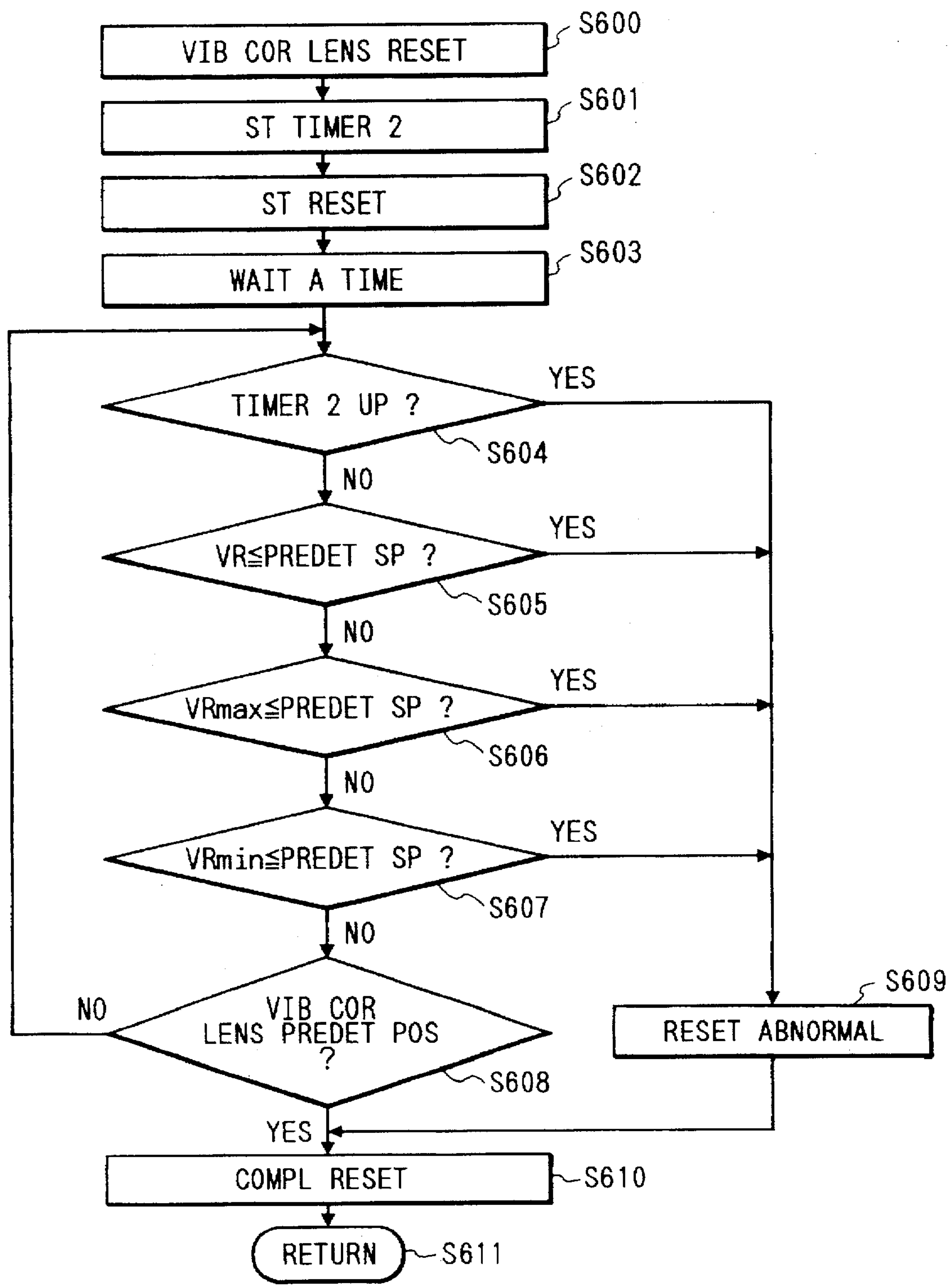
FIG. 6 is a flowchart showing the vibration correction-lens reset-driving process in a camera with a vibration correction function according to the present embodiment.

FIG. 6 is a flowchart showing the vibration-correction lens reset-driving operation of a camera with the vibration correction function according to the present invention.

In the step S601, the timer 2 starts to count the control time taken for the reset-driving operation. Then the flow goes to the step S602.

In the step S602, the motor drive circuit 8 drives the motor 11 to start the reset driving operation of the vibration correction lens 16.

By performing the timer interruption from the step S603 to the step S610 at predetermined time intervals, the lens displacement detecting circuit 18 calculates the displacement velocity VR, the maximum displacement velocity VRmax, and the minimum displacement velocity VRmin, based on the displacement of the vibration correction lens 16 and the time (not shown). For brief explanation, the reset driving direction agrees with the positive displacement velocity.

The flow waits for a predetermined period of time in the step S603 and then goes to the step S604. The reason is that it may be decided that the centering is abnormal in the following steps since the rise characteristic of the motor 11 causes a small displacement velocity immediately after the centering drive operation. The stand-by operation for a predetermined time in the step S603 is done because of the same reason as that in the step S503 shown in FIG. 5.

In the step S604, it is decided whether the timer 2 has completed its time measurement. In the step S605, the displacement velocity VR calculated is compared with the fourth predetermined velocity. In the step S606, the maximum displacement velocity VRmax calculated is compared with the sixth predetermined velocity. In the step S608, it is decided whether the vibration correction lens 16 has reached the predetermined position.

Until the vibration correction lens 16 reaches the predetermined position, the judgment is repeated in the steps S604, S605, S606, and S607. When the timer 2 has counted up, the flow goes to the step S609 at the displacement velocity VR smaller than the fourth predetermined value, the maximum displacement value VRmax smaller than the fifth predetermined value, or the minimum displacement value VRmin smaller than the sixth predetermined value, whereby the resetting is regarded as an abnormal state. Then the flow goes to the step S610.

Where something disables the smooth movement of the vibration correction lens 16 or completely catches the same, it is possible to detect an incomplete resetting after a predetermined period of time (detected in the step S604) and a bad movement of the lens (detected in the steps S605 and S606).

Here, the sixth predetermined value is set to a negative value. The reason is that if the reset driving direction has a positive value, it is unusual that the minimum displacement velocity VRmin should have a negative value. If the sixth predetermined value is negative, it can be decided that the operation of the lens displacement detecting circuit 18 is abnormal.

When the vibration correction lens 16 comes to the predetermined position in the step S608, the flow goes to the step S610.

In the step S610, the motor drive circuit 8 stops driving the motor 11, thus terminating the reset drive operation of the vibration correction lens 16. Then the flow goes to the step S414.

In the step S414, the power supply circuit 5 cuts off the electric energy to the motor drive circuits 8 and 9. Then the flow Goes to the step S415.

In the step S415, the power supply circuit 5 cuts off the electric energy to the lens displacement detecting circuits 18 and 19. Then the flow goes to the step S416. Therefore, when an abnormal reset-driving operation is detected in the steps S604, S605, S606, and S607, the resetting operation is immediately interrupted even if it has not been completed. As a result, the power supply is cut off to the motor drive circuits 8 and 9 and the lens position detecting circuits 18 and 19 so that the battery exhaustion can be prevented.

In the step S416, the motor drive circuit 10 drives the motor 13 to move the focusing lens to its original position. Then the flow Goes to the step S417.

The film winding process is performed in the step S417 and then the flow Goes to the step S418. The photographing process finishes in the step S418. Then the flow returns to the flowchart shown in FIG. 2.

As described above, explanation has been made only as to the X-axis operation. The Y-axis operation is similar to the X-axis operation. A variable acute angle prism may be used as the optical axis varying unit.

As described above, according to the present invention, with the vibration correction lens subjected to a centering drive operation preceding the exposure process, the centering drive operation is stopped if an abnormal operation is detected. Hence since the power supply is cut off to the vibration detecting unit, the drive unit, the displacement detecting unit, and similar elements, it is possible to prevent a battery from wasting its electric energy. Since the following vibration correction control is stopped, malfunction in the drive system can be prevented before it will occur.

According to the present invention, a simplified configuration can easily check an abnormal operation. The reason is that the maximum displacement velocity can be detected during a centering drive operation when the centering drive operation has not been completed after a lapse of a predetermined period from the operation starting time, when the displacement velocity during the centering drive operation is smaller than a predetermined value, or when the displacement velocity after a lapse of a predetermined period from the operation starting time is smaller than a predetermined value. The reason also is that the maximum displacement velocity after a lapse of a predetermined period from the start of the centering drive operation is detected when the maximum value is smaller than the predetermined value. The minimum displacement velocity is detected during the centering drive operation when the maximum value is smaller than the predetermined value. The minimum displacement velocity is detected after a lapse of a predetermined period from the start of the centering drive operation when the maximum value is smaller than the predetermined value. It is decided that the centering drive operation is abnormal when the maximum value is smaller than the predetermined value.

On the other hand, according to the present invention, when an abnormal vibration correction lens resetting operation is detected after a completed exposure process and a completed vibration correction control, the reset and drive operation is stopped, whereby malfunction in the drive system can be previously prevented. Since the power supply is cut off to the drive unit and the optical axis varying unit, battery unnecessary discharge can be prevented.

According to the present invention, the maximum displacement velocity is detected during the resetting operation when the resetting operation has not been completed after a lapse of a predetermined period from an operational start, when the displacement velocity is smaller than a predetermined value during a resetting drive operation, or when the displacement velocity after a lapse of a predetermined period from the start of a reset drive operation is smaller than the predetermined value. When the maximum value is smaller than the predetermined value, the maximum displacement velocity after a lapse of a predetermined period from the start time of the reset drive operation is detected during the reset drive operation. When the maximum value is smaller than the predetermined value, the minimum displacement velocity after a lapse of a predetermined period from the start time of the reset drive operation is detected during the reset drive operation. When the maximum value is smaller than the predetermined value, it is decided that the reset drive operation is abnormal. Therefore, there is an advantage in that the simplified configuration can easily decide the abnormal operation.

What is claimed is:

1. A camera with a vibration correction function comprising:

a photographing lens having a photographing optical axis;

a vibration correction lens having a corrective optical axis;

a vibration detecting unit for detecting a vibration of the camera;

an optical axis varying unit which performs a centering drive operation by substantially aligning the corrective optical axis with the photographing optical axis through displacement of said vibration correction lens and which performs a vibration correction function by varying the corrective optical axis with respect to the photographing optical axis through displacement of said vibration correction lens;

a drive unit for driving said optical axis varying unit;

a displacement detecting unit for detecting the displacement of said vibration correction lens;

a power supply unit for supplying electric power to said vibration detecting unit;

an abnormal operation detecting unit which detects an abnormal operation in said camera; and a control unit for controlling the centering drive operation, halting the centering drive operation when the abnormal operation is detected, and then stopping supply of electric power from said power supply unit to said vibration detecting unit, and for controlling the vibration correction function of the optical axis varying unit in response to the detected vibration of the camera by the vibration detecting unit.

2. The camera with a vibration correction function according to claim 1, wherein said abnormal operation detecting unit decides that the centering drive operation is abnormal when a predetermined period of time has elapsed from the start of the centering drive operation.

3. The camera with a vibration correction function according to claim 1, further comprising:

a displacement velocity calculating unit for calculating a displacement velocity based on the output from said displacement detecting unit;

wherein said abnormal operation detecting unit decides that said centering drive operation is abnormal when the displacement velocity is smaller than a predetermined value during said centering drive operation.

4. The camera with a vibration correction function according to claim 1, further comprising:

a displacement velocity calculating unit for calculating a displacement velocity based on the output from said displacement detecting unit;

wherein said abnormal operation detecting unit decides that said centering drive operation is abnormal when the displacement velocity is smaller than a predetermined value after a predetermined period of time has elapsed from the start of said centering drive operation.

5. The camera with a vibration correction function according to claim 1, further comprising:

a displacement velocity calculating unit for calculating a displacement velocity based on the output from said displacement detecting unit; and a maximum displacement velocity detecting unit for detecting the maximum value of said displacement velocity during said centering drive operation;

wherein said abnormal operation detecting unit decides that said centering drive operation is abnormal when said maximum displacement velocity detecting unit produces an output value smaller than a predetermined value during said centering drive operation.

6. The camera with a vibration correction function according to claim 1, further comprising:

a displacement velocity calculating unit for calculating a displacement velocity based on the output from said displacement detecting unit; and a maximum displacement velocity detecting unit for detecting the maximum value of said displacement velocity after a predetermined period of time has elapsed from the start of said centering drive operation;

wherein said abnormal operation detecting unit decides that said centering drive operation is abnormal when said maximum displacement velocity detecting unit produces an output value smaller than a predetermined value during said centering drive operation.

7. The camera with a vibration correction function according to claim 1, further comprising:

a displacement velocity calculating unit for calculating a displacement velocity based on the output from said displacement detecting unit; and a minimum displacement velocity detecting unit for detecting the minimum value of said displacement velocity during said centering drive operation;

wherein said abnormal operation detecting unit decides that said centering drive operation is abnormal when said minimum displacement velocity detecting unit produces an output value smaller than a predetermined value during said centering drive operation.

8. The camera with a vibration correction function according to claim 7, wherein said abnormal operation detecting unit produces a predetermined negative value which is compared with the output value from said minimum displacement velocity detecting unit during said centering drive operation.

9. The camera with a vibration correction function according to claim 1, further comprising:

a displacement velocity calculating unit for calculating a displacement velocity based on the output from said displacement detecting unit; and a minimum displacement velocity detecting unit for detecting the minimum value of said displacement velocity after a predetermined period of time has elapsed from the start of said centering drive operation;

wherein said abnormal operation detecting unit decides that said centering drive operation is abnormal when said minimum displacement velocity detecting unit produces an output value smaller than a predetermined value during said centering drive operation.

10. The camera with a vibration correction function according to claim 9, wherein said abnormal operation detecting unit produces a predetermined negative value which is compared with the output value from said minimum displacement velocity detecting unit during said centering drive operation.

11. The camera with a vibration correction function according to claim 1, wherein said abnormal operation detecting unit halts the vibration correction function of said optical axis varying unit when it is detected that said centering drive operation is abnormal.

12. A camera with a vibration correction function comprising:

a photographing lens having a photographing optical axis;

a vibration correction lens having a corrective optical axis;

a vibration detecting unit for detecting a vibration of the camera;

an optical axis varying unit which performs a centering drive operation by substantially aligning the corrective optical axis with the photographing optical axis through displacement of said vibration correction lens and which performs a vibration correction function by varying the corrective optical axis with respect to the photographing optical axis through displacement of said vibration correction lens;

a drive unit for driving said optical axis varying unit;

a displacement detecting unit for detecting the displacement of said vibration correction lens;

a power supply unit for supplying electric power to said drive unit;

an abnormal operation detecting unit which detects an abnormal operation in said camera; and a control unit for controlling the centering drive operation, halting the centering drive operation when the abnormal operation is detected, and then stopping supply of electric power from said power supply unit to said drive unit, and for controlling the vibration correction function of the optical axis varying unit in response to the detected vibration of the camera by the vibration detecting unit.

13. The camera with a vibration correction function according to claim 12, wherein said abnormal operation detecting unit decides that the centering drive operation is abnormal when a predetermined period of time has elapsed from the start of the centering drive operation.

14. The camera with a vibration correction function according to claim 12, further comprising:

a displacement velocity calculating unit for calculating a displacement velocity based on the output from said displacement detecting unit;

wherein said abnormal operation detecting unit decides that said centering drive operation is abnormal when the displacement velocity is smaller than a predetermined value during said centering drive operation.

15. The camera with a vibration correction function according to claim 12, further comprising:

a displacement velocity calculating unit for calculating a displacement velocity based on the output from said displacement detecting unit;

wherein said abnormal operation detecting unit decides that said centering drive operation is abnormal when the displacement velocity is smaller than a predetermined value after a predetermined period of time has elapsed from the start of said centering drive operation.

16. The camera with a vibration correction function according to claim 12, further comprising:

a displacement velocity calculating unit for calculating a displacement velocity based on the output from said displacement detecting unit; and a maximum displacement velocity detecting unit for detecting the maximum value of said displacement velocity during said centering drive operation;

wherein said abnormal operation detecting unit decides that said centering drive operation is abnormal when said maximum displacement velocity detecting unit produces an output value smaller than a predetermined value during said centering drive operation.

17. The camera with a vibration correction function according to claim 12, further comprising:

a displacement velocity calculating unit for calculating a displacement velocity based on the output from said displacement detecting unit; and a maximum displacement velocity detecting unit for detecting the maximum value of said displacement velocity after a predetermined period of time has elapsed from the start of said centering drive operation;

wherein said abnormal operation detecting unit decides that said centering drive operation is abnormal when said maximum displacement velocity detecting unit produces an output value smaller than a predetermined value during said centering drive operation.

18. The camera with a vibration correction function according to claim 12, further comprising:

a displacement velocity calculating unit for calculating a displacement velocity based on the output from said displacement detecting unit; and a minimum displacement velocity detecting unit for detecting the minimum value of said displacement velocity during said centering drive operation;

wherein said abnormal operation detecting unit decides that said centering drive operation is abnormal when said minimum displacement velocity detecting unit produces an output value smaller than a predetermined value during said centering drive operation.

19. The camera with a vibration correction function according to claim 18, wherein said abnormal operation detecting unit produces a predetermined negative value which is compared with the output value from said minimum displacement velocity detecting unit during said centering drive operation.

20. The camera with a vibration correction function according to claim 12, further comprising:

a displacement velocity calculating unit for calculating a displacement velocity based on the output from said displacement detecting unit; and a minimum displacement velocity detecting unit for detecting the minimum value of said displacement velocity after a predetermined period of time has elapsed from the start of said centering drive operation;

wherein said abnormal operation detecting unit decides that said centering drive operation is abnormal when said minimum displacement velocity detecting unit produces an output value smaller than a predetermined value during said centering drive operation.

21. The camera with a vibration correction function according to claim 20, wherein said abnormal operation detecting unit produces a predetermined negative value which is compared with the output value from said minimum displacement velocity detecting unit during said centering drive operation.

22. The camera with a vibration correction function according to claim 12, wherein said abnormal operation detecting unit performs a vibration corrective control under which said drive unit is driven to correct vibration of said camera, based on an output from said vibration corrective detecting unit, and halts the vibration corrective operation when it is detected that said centering drive operation is abnormal.

23. A camera with a vibration correction function comprising:

a photographing lens having a photographing optical axis;

a vibration correction lens having a corrective optical axis;

a vibration detecting unit for detecting a vibration of the camera;

an optical axis varying unit which performs a centering drive operation by substantially aligning the corrective optical axis with the photographing optical axis through displacement of said vibration correction lens and which performs a vibration correction function by varying the corrective optical axis with respect to the photographing optical axis through displacement of said vibration correction lens;

a drive unit for driving said optical axis varying unit;

a displacement detecting unit for detecting the displacement of said vibration correction lens;

a power supply unit for supplying electric power to said displacement detecting unit; and a control unit for controlling the centering drive operation, halting the centering drive operation when the abnormal operation is detected, and then stopping supply of electric power from said power supply unit to said displacement detecting unit, and for controlling the vibration correction function of the optical axis varying unit in response to the detected vibration of the camera by the vibration detecting unit.

24. The camera with a vibration correction function according to claim 23, wherein said abnormal operation detecting unit decides that the centering drive operation is abnormal when a predetermined period of time has elapsed from the start of the centering drive operation.

25. The camera with a vibration correction function according to claim 23, further comprising:

a displacement velocity calculating unit for calculating a displacement velocity based on the output from said displacement detecting unit;

wherein said abnormal operation detecting unit decides that said centering drive operation is abnormal when the displacement velocity is smaller than a predetermined value during said centering drive operation.

26. The camera with a vibration correction function according to claim 23, further comprising:

a displacement velocity calculating unit for calculating a displacement velocity based on the output from said displacement detecting unit;

wherein said abnormal operation detecting unit decides that said centering drive operation is abnormal when the displacement velocity is smaller than a predetermined value after a predetermined period of time has elapsed from the start of said centering drive operation.

27. The camera with a vibration correction function according to claim 23, further comprising:

a displacement velocity calculating unit for calculating a displacement velocity based on the output from said displacement detecting unit; and a maximum displacement velocity detecting unit for detecting the maximum value of said displacement velocity during said centering drive operation;

wherein said abnormal operation detecting unit decides that said centering drive operation is abnormal when said maximum displacement velocity detecting unit produces an output value smaller than a predetermined value during said centering drive operation.

28. The camera with a vibration correction function according to claim 23, further comprising:

a displacement velocity calculating unit for calculating a displacement velocity based on the output from said displacement detecting unit; and a maximum displacement velocity detecting unit for detecting the maximum value of said displacement velocity after a predetermined period of time has elapsed from the start of said centering drive operation;

wherein said abnormal operation detecting unit decides that said centering drive operation is abnormal when said maximum displacement velocity detecting unit produces an output value smaller than a predetermined value during said centering drive operation.

29. The camera with a vibration correction function according to claim 23, further comprising:

a displacement velocity calculating unit for calculating a displacement velocity based on the output from said displacement detecting unit; and a minimum displacement velocity detecting unit for detecting the minimum value of said displacement velocity during said centering drive operation;

wherein said abnormal operation detecting unit decides that said centering drive operation is abnormal when said minimum displacement velocity detecting unit produces an output value smaller than a predetermined value during said centering drive operation.

30. The camera with a vibration correction function according to claim 29, wherein said abnormal operation detecting unit produces a predetermined negative value which is compared with the output value from said minimum displacement velocity detecting unit during said centering drive operation.

31. The camera with a vibration correction function according to claim 23, further comprising:

a displacement velocity calculating unit for calculating a displacement velocity based on the output from said displacement detecting unit; and a minimum displacement velocity detecting unit for detecting the minimum value of said displacement velocity after a predetermined period of time has elapsed from the start of said centering drive operation;

wherein said abnormal operation detecting unit decides that said centering drive operation is abnormal when said minimum displacement velocity detecting unit produces an output value smaller than a predetermined value during said centering drive operation.

32. The camera with a vibration correction function according to claim 31, wherein said abnormal operation detecting unit produces a predetermined negative value which is compared with the output value from said minimum displacement velocity detecting unit during said centering drive operation.

33. The camera with a vibration correction function according to claim 23, wherein said abnormal operation detecting unit halts the vibration correction function of said optical axis varying unit when it is detected that said centering drive is abnormal.

34. A camera with a vibration correction function comprising:

a photographing lens having a photographing optical axis;

a vibration correction lens having a corrective optical axis;

an optical axis varying unit which performs a reset-driving operation by substantially aligning the corrective optical axis with the photographing optical axis through displacement of said vibration correction lens and which performs a vibration correction function by varying the corrective optical axis with respect to the photographing optical axis through displacement of said vibration correction lens;

a drive unit for driving said optical axis varying unit;

a displacement detecting unit for detecting the displacement of said vibration correction lens;

a power supply unit for supplying electric power to said drive unit;

an abnormal operation detecting unit which detects an abnormal reset-driving operation in said camera; and a control unit for controlling the reset-driving operation, halting the reset-driving operation when the abnormal reset-driving operation is detected, and then stopping supply of electric power from said power supply unit to said drive unit, and for controlling the vibration correction function of the optical axis varying unit in response to the detected vibration of the camera by the vibration detecting unit.

35. The camera with a vibration correction function according to claim 34, wherein said abnormal operation detecting unit decides that the reset-driving operation is abnormal when a predetermined period of time has elapsed from the start of the reset-driving operation.

36. The camera with a vibration correction function according to claim 34, further comprising:

a displacement velocity calculating unit for calculating displacement velocity based on the output from said displacement detecting unit;

wherein said abnormal operation detecting unit decides that said reset-driving operation is abnormal when the displacement velocity is smaller than a predetermined value during said reset-driving operation.

37. The camera with a vibration correction function according to claim 34, further comprising:

a displacement velocity calculating unit for calculating a displacement velocity based on the output from said displacement detecting unit;

wherein said abnormal operation detecting unit decides that said reset-driving operation is abnormal when the displacement velocity is smaller than a predetermined value after a predetermined period of time has elapsed from the start of said reset-driving operation.

38. The camera with a vibration correction function according to claim 34, further comprising:

a displacement velocity calculating unit for calculating a displacement velocity based on the output from said displacement detecting unit; and a maximum displacement velocity detecting unit for detecting the maximum value of said displacement velocity during said reset-driving operation;

wherein said abnormal operation detecting unit decides that said reset-driving operation is abnormal when said maximum displacement velocity detecting unit produces an output value smaller than a predetermined value during said reset-driving operation.

39. The camera with a vibration correction function according to claim 34, further comprising:

a displacement velocity calculating unit for calculating a displacement velocity based on the output from said displacement detecting unit; and a maximum displacement velocity detecting unit for detecting the maximum value of said displacement velocity after a predetermined period of time has elapsed from the start of said reset-driving operation;

wherein said abnormal operation detecting unit decides that said reset-driving operation is abnormal then said maximum displacement velocity detecting unit produces an output value smaller than a predetermined value during said reset-driving operation.

40. The camera with a vibration correction function according to claim 34, further comprising:

a displacement velocity calculating unit for calculating a displacement velocity based on the output from said displacement detecting unit; and a minimum displacement velocity detecting unit for detecting that the minimum value of said displacement velocity during said reset-driving operation is abnormal when said minimum displacement velocity detecting unit produces an output value smaller than a predetermined value during said reset-driving operation.

41. The camera with a vibration correction function according to claim 40, wherein said abnormal operation detecting unit produces a predetermined negative value which is compared with the output value from said minimum displacement velocity detecting unit during said reset-driving operation.

42. The camera with a vibration correction function according to claim 34, further comprising:

a displacement velocity calculating unit for calculating a displacement velocity based on the output from said displacement detecting unit; and a minimum displacement velocity detecting unit for detecting the minimum value of said displacement velocity after a predetermined period of time has elapsed from the start of said reset-driving operation;

wherein said abnormal operation detecting unit decides that said reset-driving operation is abnormal when said minimum displacement velocity detecting unit produces an output value smaller than a predetermined value during said reset-driving operation.

43. The camera with a vibration correction function according to claim 42, wherein said abnormal operation detecting unit produces a predetermined negative value which is compared with the output value from said minimum displacement velocity detecting unit during said reset-driving operation.

44. A camera with a vibration correction function comprising:

a photographing lens having a photographing optical axis;

a vibration correction lens having a corrective optical axis;

an optical axis varying unit which performs a reset-driving operation by substantially aligning the corrective optical axis with the photographing optical axis through displacement of said vibration correction lens and which performs a vibration correction function by varying the corrective optical axis with respect to the photographing optical axis through displacement of said vibration correction lens;

a drive unit for driving said optical axis varying unit;

a displacement detecting unit for detecting the displacement of said vibration correction lens;

a power supply unit for supplying electric power to said displacement detecting unit;

an abnormal operation detecting unit which detects an abnormal operation in said camera; and a control unit for controlling the reset-driving operation, halting the reset-driving operation when the abnormal operation is detected, and then stopping supply of electric power from said power supply unit to said displacement detecting unit, and for controlling the vibration correction function of the optical axis varying unit in response to the detected vibration of the camera by the vibration detecting unit.

45. The camera with a vibration correction function according to claim 44, wherein said abnormal operation detecting unit decides that the reset-driving operation is abnormal when a predetermined period of time has elapsed from the start of the reset-driving operation.

46. The camera with a vibration correction function according to claim 44, further comprising:

a displacement velocity calculating unit for calculating a displacement velocity based on the output from said displacement detecting unit;

wherein said abnormal operation detecting unit decides that said reset-driving operation is abnormal when the displacement velocity is smaller than a predetermined value during said reset-driving operation.

47. The camera with a vibration correction function according to claim 44, further comprising:

a displacement velocity calculating unit for calculating a displacement velocity based on the output from said displacement detecting unit;

wherein said abnormal operation detecting unit decides that said reset-driving operation is abnormal when the displacement velocity is smaller than a predetermined value after a predetermined period of time has elapsed from the start of said reset-driving operation.

48. The camera with a vibration correction function according to claim 44, further comprising:

a displacement velocity calculating unit for calculating a displacement velocity based on the output from said displacement detecting unit; and a maximum displacement velocity detecting unit for detecting the maximum value of said displacement velocity during said reset-driving operation;

wherein said abnormal operation detecting unit decides that said reset-driving operation is abnormal when said maximum displacement velocity detecting unit produces an output value smaller than a predetermined value during said reset-driving operation.

49. The camera with a vibration correction function according to claim 44, further comprising:

a displacement velocity calculating unit for calculating a displacement velocity based on the output from said displacement detecting unit; and a maximum displacement velocity detecting unit for detecting the maximum value of said displacement velocity after a predetermined period of time has elapsed from the start of said reset-driving operation;

wherein said abnormal operation detecting unit decides that said reset-driving operation is abnormal when said maximum displacement velocity detecting unit produces an output value smaller than a predetermined value during said reset-driving operation.

50. The camera with a vibration correction function according to claim 44, further comprising:

a displacement velocity calculating unit for calculating a displacement velocity based on the output from said displacement detecting unit; and a minimum displacement velocity detecting unit for detecting the minimum value of said displacement velocity during said reset-driving operation;

wherein said abnormal operation detecting unit decides that said reset-driving operation is abnormal when said minimum displacement velocity detecting unit produces an output value smaller than a predetermined value during said reset-driving operation.

51. The camera with a vibration correction function according to claim 50, wherein said abnormal operation detecting unit produces a predetermined negative value which is compared with the output value from said minimum displacement velocity detecting unit during said reset-driving operation.

52. The camera with a vibration correction function according to claim 44, further comprising:

a displacement velocity calculating unit for calculating a displacement velocity based on the output from said displacement detecting unit; and a minimum displacement velocity detecting unit for detecting the minimum value of said displacement velocity after a predetermined period of time has elapsed from the start of said reset-driving operation;

wherein said abnormal operation detecting unit decides that said reset-driving operation is abnormal when said minimum displacement velocity detecting unit produces an output value smaller than a predetermined value during said reset-driving operation.

53. The camera with a vibration correction function according to claim 52, wherein said abnormal operation detecting unit produces a predetermined negative value which is compared with the output value from said minimum displacement velocity detecting unit during said reset-driving operation.

* * * * *

UNITED STATES PATENT AND TRADEMARK OFFICE

CERTIFICATE OF CORRECTION

PATENT NO. : 5,721,968

DATED : February 24, 1998

INVENTOR(S) : Yukikazu IWANE, et al.

It is certified that error appears in the above-identified patent and that said Letters Patent is hereby corrected as shown below:

Title Page, Item [63] change "Jul. 8, 1995" to --Jul. 8, 1996--.

Signed and Sealed this

Ninth Day of June, 1998

Attest:

BRUCE LEHMAN

Attesting Officer

*Commissioner of Patents and Trademarks*